US008464911B2

(12) United States Patent
Palmer et al.

(10) Patent No.: US 8,464,911 B2
(45) Date of Patent: Jun. 18, 2013

(54) CONTAINER FOR SEGREGATING AND BLENDING MULTIPLE SEED TYPES (75) Inventors: Damon M. Palmer, Pittsboro, IN (US); William D. Bush, Carmel, IN (US); Jeffrey A. Housman, De Witt, IA (US)

(73) Assignee: Dow AgroSciences, LLC., Indianapolis, IN (US)

( * ) Notice: Subject to any disclaimer, the term of this patent is extended or adjusted under 35 U.S.C. 154(b) by 0 days.

(21) Appl. No.: 13/379,400

(22) PCT Filed: Jul. 1, 2010

(86) PCT No.: PCT/US2010/040776
§ 371 (c)(1),
(2), (4) Date: Dec. 20, 2011

(87) PCT Pub. No.: WO2011/005655
PCT Pub. Date: Jan. 13, 2011

(65) Prior Publication Data
US 2012/0104043 A1    May 3, 2012

Related U.S. Application Data (60) Provisional application No. 61/224,043, filed on Jul. 8, 2009.

(51) Int. Cl.
*B65G 65/00*    (2006.01)
(52) U.S. Cl.
USPC ............ 222/129; 222/1; 222/136; 222/145.1; 220/23.83; 220/506

(58) Field of Classification Search
USPC .................. 222/129, 134–137, 145.1, 145.4, 222/1; 111/11, 130; 220/23.83, 23.87, 23.89, 220/506; 47/57.6
See application file for complete search history.

(56) References Cited

U.S. PATENT DOCUMENTS

| 1,925,541 | A | * | 9/1933 | Noble ........................... 222/132 |
| 2,455,572 | A | * | 12/1948 | Evans ........................... 366/336 |
| 3,730,395 | A | * | 5/1973 | Gallogly et al. ........... 222/145.5 |
| 5,080,259 | A | * | 1/1992 | Hadley ........................ 222/83.5 |
| 5,950,373 | A | | 9/1999 | Von Hoff et al. |
| 6,024,033 | A | | 2/2000 | Kinkead et al. |
| 6,290,099 | B1 | | 9/2001 | Melton |
| 6,598,762 | B2 | | 7/2003 | McKune |
| 2007/0095854 | A1 | * | 5/2007 | House et al. .................... 222/63 |

OTHER PUBLICATIONS

International Search Report for Application No. PCT/US2010/040776 (10 pgs.).

* cited by examiner

*Primary Examiner* — J. Casimer Jacyna
(74) *Attorney, Agent, or Firm* — C. W. Arnett; Faegre Baker Daniels LLP (57) ABSTRACT A container is disclosed which segregates at least two types of seed during storage and blends the at least two types of seed together when emptied from the container. The container has a first compartment and a second compartment, the first compartment storing a first type of seed and the second compartment storing a second type of seed. A method is disclosed for blending at least two types of seed together.

30 Claims, 10 Drawing Sheets

CONTAINER FOR SEGREGATING AND BLENDING MULTIPLE SEED TYPES

CROSS-REFERENCE TO RELATED APPLICATION

This application is a National Stage filing of International Application Serial No. PCT/US2010/40776, entitled "CONTAINER FOR SEGREGATING AND BLENDING MULTIPLE SEED TYPES" filed Jul. 1, 2010, which claims the benefit under 35 U.S.C. §119 of U.S. Provisional Application No. 61/224,043, filed Jul. 8, 2009, the disclosures of which are expressly incorporated herein by reference

RELATED APPLICATIONS

The entire disclosure of U.S. Provisional Patent Application Ser. No. 61/224,043, filed Jul. 8, 2009, titled CONTAINER FOR SEGREGATING AND BLENDING MULTIPLE SEED TYPES, is expressly incorporated by reference herein.

FIELD

The present invention relates to methods and apparatus for blending multiple components of a mixture and in particular to the blending of multiple seeds in a seed mixture.

BACKGROUND

GMO ("genetically modified organism") seeds have been developed which produce plants that are resistant to at least one of a particular type or family of pests or pesticides such as insects, fungi, insecticides, and herbicides. GMO seeds are often planted as part of a mixture including refuge seed. The refuge seed has not been genetically modified in the same way as the GMO seed and does not produce a resistant plant.

In some situations, the mixture of GMO seed and refuge seed is planted in an effort to prevent the insect population from becoming resistant to a particular type of plant produced by the GMO seed. Regulatory bodies such as the EPA help determine and regulate the ratio of refuge seed to GMO seed that must be planted to preserve the usefulness of the GMO seed. Growers may plant refuge seed separately from GMO seed or acquire premixed GMO and refuge seed from seed suppliers.

SUMMARY

In an exemplary embodiment of the present disclosure, a container is provided which segregates at least two types of seed during storage and blends the at least two types of seed together when emptied from the container. In another exemplary embodiment of the present disclosure, a method is provided for blending at least two types of seed together.

In another exemplary embodiment of the present disclosure, an apparatus for holding and delivering seed is provided. The apparatus including a container having a first compartment and a second compartment, the first compartment storing a first type of seed and the second compartment storing a second type of seed; and a gate moveably coupled to the container. The gate being moveable to a first open position permitting the first type of seed to empty from the first compartment and at the same time permitting the second type of seed to empty from the second compartment. The first compartment and the second compartment segregating the first type of seed from the second type of seed until the first type of seed and the second type of seed are emptied from the first compartment and the second compartment, respectively. In one example, the first compartment generally surrounds the second compartment. In another example, the apparatus further comprises a second container. The second container being removably coupled to the container and including the second compartment such that the second compartment is removable relative to the first compartment. In one variation, the second container includes an upper portion, the upper portion of the second container located relative to the first container with a plurality of support bars. The support bars coupling the upper portion of the second container to the first container. In another variation, the second container includes a lower portion. The lower portion of the second container being located by at least one supporting element of the first container. In yet another variation, the apparatus further comprises a lid. The lid configured to be coupled to the upper portion of the second container in order to limit access to the second compartment. The lid may be locked relative to the second container. The lid may include identifying indicia of the second type of seed. The identifying indicia may be a color of the lid. The lid may permit visual inspection of the second seed in the second compartment from an exterior of the second container. In another example, the first type of seed exits the first compartment through a lower portion of the first compartment and the second type of seed exits the second compartment through a lower portion of the second compartment. In a variation thereof, the first type of seed exits the first compartment and the second type of seed exits the second compartment in a generally constant ratio. The generally constant ratio may be about 95 to 5. In yet another example, the second compartment is contained by the first compartment. In a further example, the apparatus includes a region for receiving a tool for moving the apparatus. In a variation thereof, the apparatus further comprises a plurality of spaced apart feet which define the region for receiving the tool for moving the apparatus. In yet a further example, the gate is in contact with both the first type of seed in the first compartment and the second type of seed in the second compartment when the gate is in a closed position. In still a further example, the gate translates relative to the container to move to the first open position from a closed position. In a variation thereof, the gate translates in a single direction to move to the first open position from the closed position. The apparatus may further comprise spaced apart channel members which receive the gate and constrain a movement of the gate relative to the container. In still yet another example, the apparatus further comprises spaced apart channel members which receive the gate and constrain a movement of the gate relative to the container. In still a further example, the gate is moveable to a second open position, a first ratio of the first type of seed being emptied from the first compartment to the second type of seed being emptied from the second compartment when the gate is in the first open position is generally equal to a second ratio of the first type of seed being emptied from the first compartment to the second type of seed being emptied from the second compartment when the gate is in the second open position. In a variation thereof, the ratio of the first type of seed being emptied from the first compartment to the second type of seed being emptied from the second compartment when the gate is generally constant at all positions of the gate between the first open position and the second open position.

In yet another exemplary embodiment of the present disclosure, an apparatus for holding and delivering seed is provided. The apparatus including a container having multiple compartments, each compartment holding a respective type of seed; and a gate for controlling the emptying of the respective types of seed from the container, the container and the gate cooperating to empty the respective types of seed in a generally constant ratio independent of a flow rate of the respective types of seed. In one example, the respective seed types for each of the multiple compartments empty through at least one opening in a lower portion of the respective compartment. In a variation thereof, the at least one opening for each of the multiple compartments defines a cross sectional area for the respective compartment, a ratio of the cross-sectional areas of the multiple compartments are defined in order to release a predetermined ratio of the types of seeds. The multiple compartments may include a first compartment holding a first type of seed and a second compartment holding a second type of seed, the first compartment including a plurality of openings in the lower portion of the first compartment through which the first type of seed is emptied. An opening in the lower portion of the second compartment may be positioned between a first opening of the plurality of openings in the lower portion of the first compartment and a second opening of the plurality of openings in the lower portion of the first compartment. The first compartment may have angled walls which direct the first type of seed towards the second type of seed upon exiting the container. The angled walls may extend to an upper portion of container. The angled walls may intersect with generally straight walls in a portion of the container between a lower portion of the container and an upper portion of the container. In another variation, the multiple compartments include a first compartment holding a first type of seed and a second compartment holding a second type of seed, the at least one opening of the first compartment being positioned around a plurality of sides of an opening in the lower portion of the second compartment. The plurality of sides may include opposite sides. The opening in the lower portion of the second compartment may be positioned between a first opening of the plurality of openings in the lower portion of the first compartment and a second opening of the plurality of openings in the lower portion of the first compartment. The first opening of the first compartment and the opening of the lower portion of the second compartment may be generally coextensive along a first direction. The first opening of the first compartment and the opening of the lower portion of the second compartment may be quadrilaterals. In another example, the generally constant ratio is a ratio of the first type of seed to the second type of seed and the generally constant ratio is 95:5.

In yet another exemplary embodiment of the present disclosure, a method for delivering a mixture of seed is provided. The method comprising the steps of: holding a first type of seed in a first compartment; holding a second type of seed in a second compartment; and emptying the first type of seed from the first compartment and the second type of seed from the second compartment at a generally constant ratio independent of a flow rate of the first type of seed and the second type of seed. In one example, the second type of seed is segregated from the first type of seed until the second type of seed and the first type of seed exit the first compartment and the second compartment, respectively. In a variation thereof, the first compartment and the second compartment are provided within an interior of a container. The first type of seed and the second type of seed may be emptied from the first compartment and the second compartment simultaneously. In another example, the generally constant ratio is a ratio of the first type of seed to the second type of seed and the generally constant ratio is 95:5.

In still another exemplary embodiment of the present disclosure, a method for delivering a mixture of seed is provided. The method comprising the steps of: holding a first type of seed in a first compartment in an interior of a container; holding a second type of seed in a second compartment which is provided within the interior of the container; and emptying the first type of seed from the first compartment and the second type of seed from the second compartment at a generally constant ratio. In one example, the method further comprises the step of locking the second compartment to limit access to the second compartment. In another example, the step of emptying the first type of seed from the first compartment and the second type of seed from the second compartment includes the step of simultaneously opening a lower portion of the first compartment and a lower portion of the second compartment. In a variation thereof, the step of simultaneously opening the lower portion of the first compartment and the lower portion of the second compartment includes the step of moving a gate relative to the container, the gate and the container cooperating to close the lower portion of the first compartment and the lower portion of the second compartment when the gate is in a first position relative to the container. In a further example, the second compartment is provided in a second container positioned within the interior of the container. In still a further example, the generally constant ratio is a ratio of the first type of seed to the second type of seed and the generally constant ratio is 95:5. In yet still a further example, the method further comprises the step of blending the first type of seed and the second type of seed upon exiting the first compartment and the second compartment, respectively.

The above mentioned and other features of the invention, and the manner of attaining them, will become more apparent and the invention itself will be better understood by reference to the following description of embodiments of the invention taken in conjunction with the accompanying drawings. These features can be used without exclusion in any combination or permutation.

BRIEF DESCRIPTION OF THE DRAWINGS

Corresponding reference characters indicate corresponding parts throughout the several views.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to the blending of seeds which are stored in multiple compartments of a container, it should be understood that the features disclosed herein may have application to the blending of other components stored in multiple compartments of a container.

Figure 1:
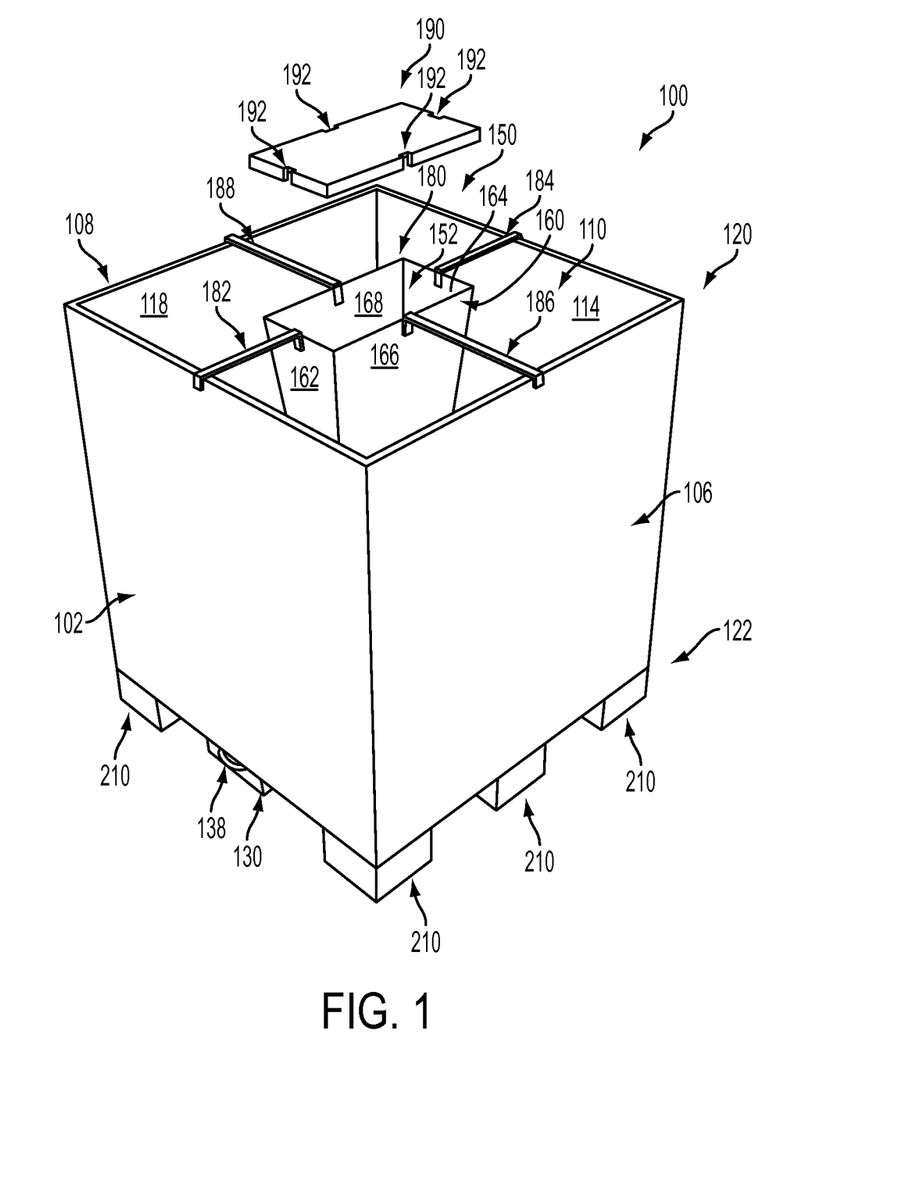
FIG. 1 illustrates a perspective view of a container having an interior thereof separated into multiple compartments.

Referring to FIG. 1, a container 100 is shown. Container 100 includes a front upstanding wall 102, a rear upstanding wall 104, a first side upstanding wall 106 and a second side upstanding wall 108. Walls 102-108 cooperate to define an interior 110 of container 100. Although container 100 is shown as being a four sided container, container 100 may have any number of sides, be generally cylindrical, be generally elliptical, or any other suitable shape. In one embodiment, container 100 is made of polyethylene. In one embodiment, container 100 is a collapsible container, such as the Center Flow Bulk Container available from Buckhorn located at 55 West TechneCenter Drive in Milford, Ohio 45150.

Figure 2:
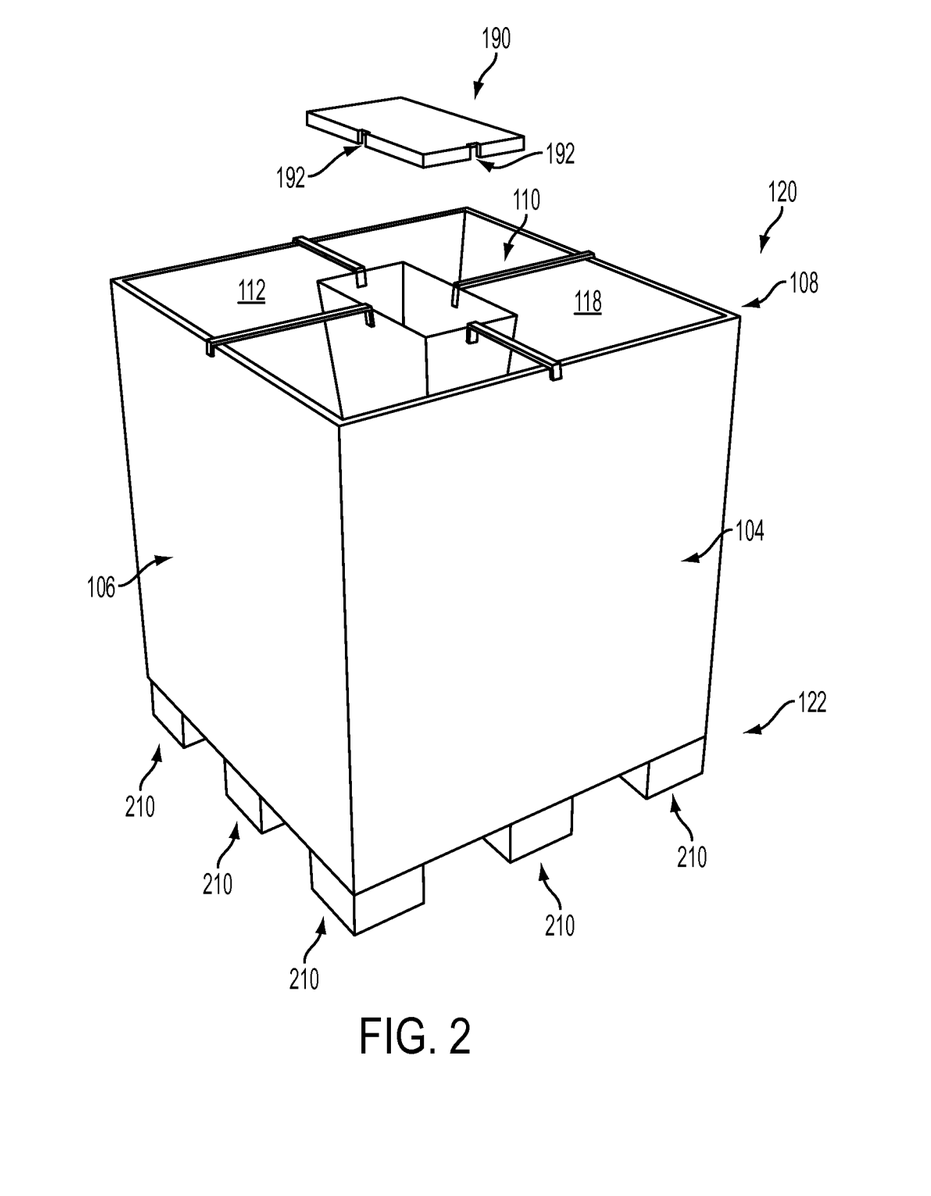
FIG. 2 illustrates another perspective view of the container of FIG. 1.
Figure 4:
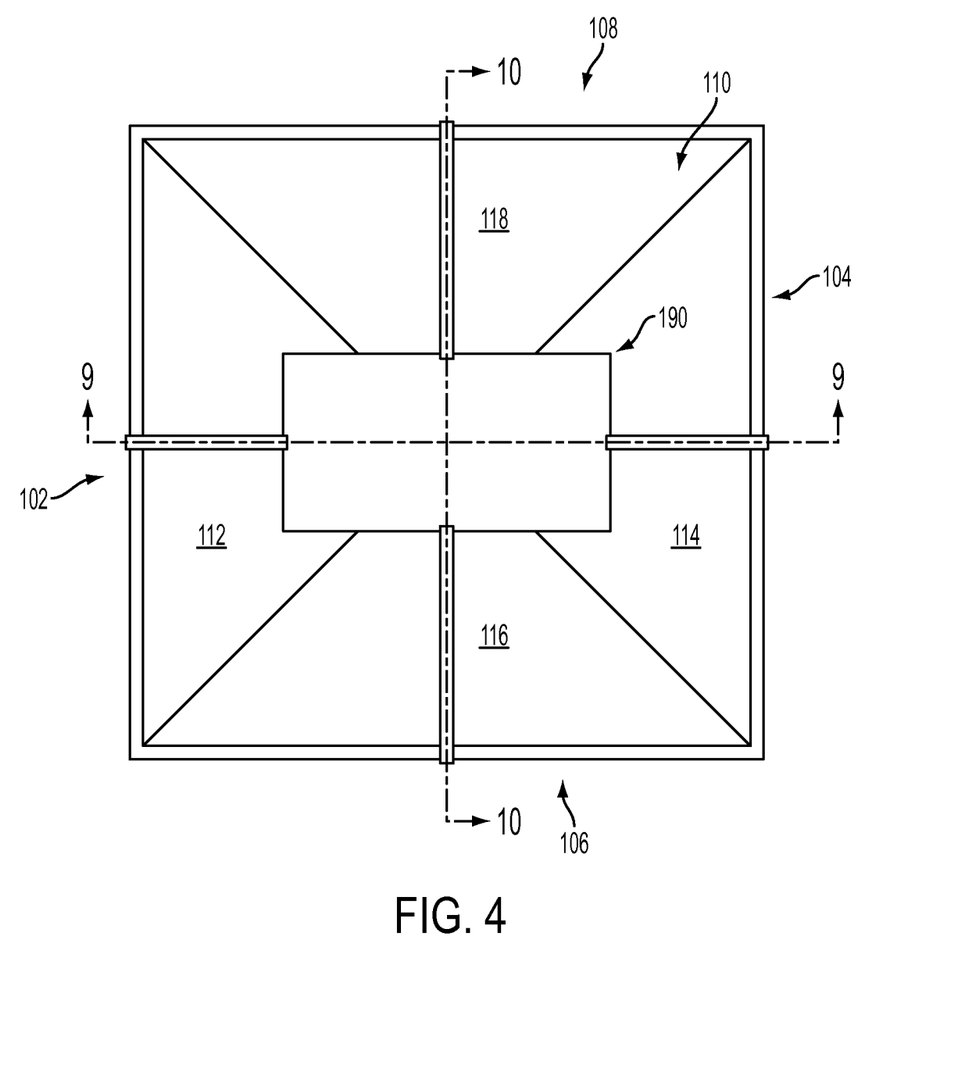
FIG. 4 illustrates a top view of the container of FIG. 1.
Figure 9:
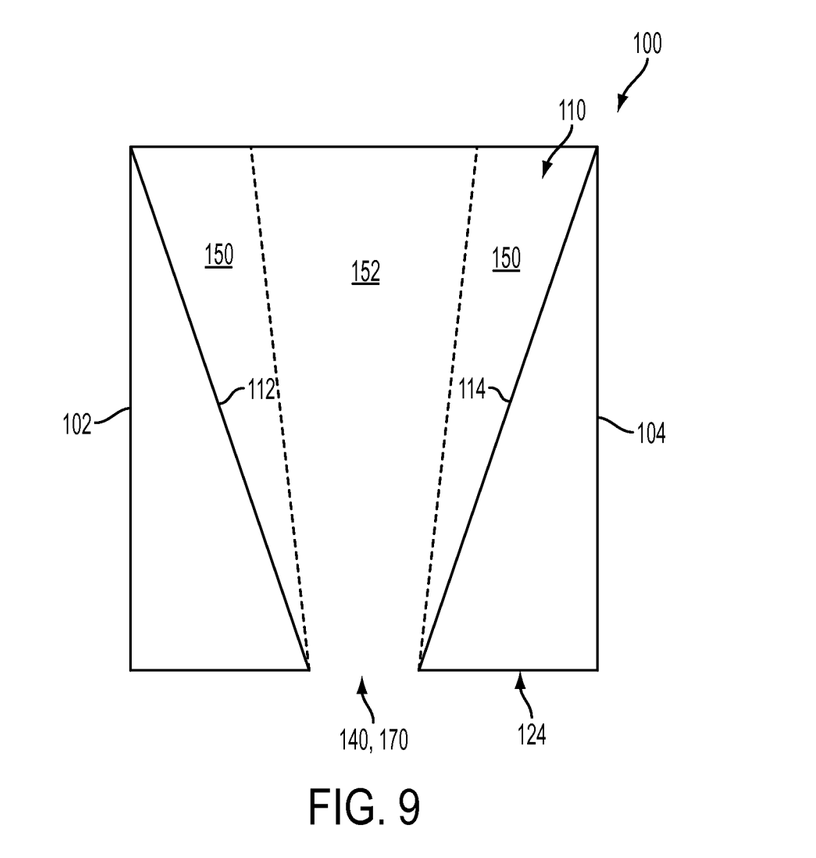
FIG. 9 illustrates the relative size of the multiple compartments of the container along lines 9-9 in FIG. 4.
Figure 10:
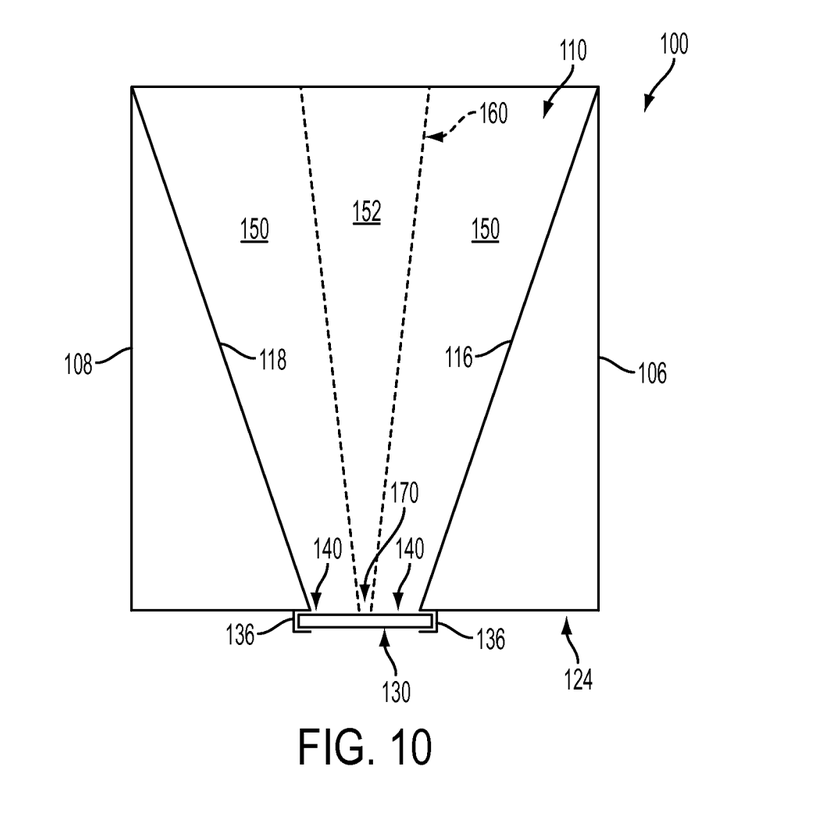
FIG. 10 illustrates the relative size of the multiple compartments of the container along lines 10-10 in FIG. 4

Referring to FIGS. 2 and 4, container 100 also includes walls 112, 114, 116, and 118 which are angled inward from an upper portion 120 of container 100 to a lower portion 122 of container 100. Referring to FIGS. 9 and 10, in the illustrated embodiment, walls 112-118 are angled inward along their whole extend. In one embodiment, walls 112-118 are angled inward only for a portion proximate to lower portion 122 and generally straight for the remainder of walls 112-114. In one embodiment, walls 112-118 intersect with walls 102-108 not at upper portion 120, but rather in a middle portion of walls 102-108. In either of these two cases the volume of interior 110 is increased. The angling of walls 112-118 assist in directing the seed in interior 110 towards an opening 140 (see FIG. 5) of container 100 in a bottom wall 124.

Figure 5:
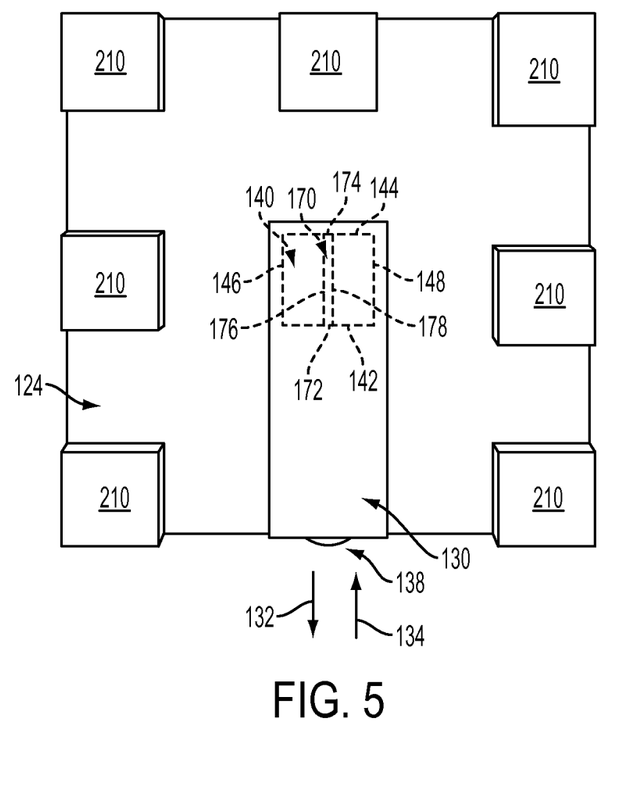
FIG. 5 illustrates a bottom view of the container of FIG. 1 and a gate covering the respective openings of the multiple compartments of the container of FIG. 1.

Referring to FIG. 5, a bottom wall 124 of container 100 is shown. Bottom wall 124 supports a gate 130 which is moveably coupled to bottom wall 124. In the illustrated embodiment, gate 130 is slideably coupled to bottom wall 124 to permit gate 130 to move in direction 132 and direction 134. An operator may grasp a handle 138 to aid in moving gate 130 in direction 132 and direction 134.

Referring to FIG. 10, in one embodiment, container 100 includes channel members 136 which support gate 130 and permit the movement of gate 130 in directions 132 and 134. Channel members 136, in one embodiment, are coupled to bottom wall 124. Channel members 136, in one embodiment, are integrally formed as part of bottom wall 124.

Returning to FIG. 5, an opening 140 is formed in bottom wall 124. Material, such as seeds, being held in interior 110 passes through opening 140 when gate 130 is moved in direction 132. Opening 140 is bounded by lower edges 142-148 of walls 112-118, respectively.

Returning to FIG. 1, interior 110 is divided into a first compartment 150 and a second compartment 152. Second compartment 152 is separate from first compartment 150, such that seeds stored in first compartment 150 remain segregated from seeds stored in second compartment 152 while being stored in container 100.

Second compartment 152 is formed by a container 160. In the illustrated embodiment, container 160 is formed of walls 162-168. Each of walls 162-168 are shown as angling inward from upper portion 120 to lower portion 122. The angling of walls 162-168 assist in directing the seed in second compartment 152 towards an opening 170 (see FIG. 5) of container 100 in a bottom wall 124. Material, such as seeds, being held in interior 110 passes through opening 170 when gate 130 is moved in direction 132. Opening 170 is bounded by lower edges 172-178 of walls 162-168, respectively. In one embodiment, lower edges 172-178 are generally coplanar with lower edges 142-148.

Container 160, in the illustrated embodiment, is spaced apart from walls 112-118 at upper portion 120 of container 100. The upper portion 180 of container 160 is generally secured in place with support bars 182-188. In one embodiment, support bars 182-188 are releasably coupled to one of interior 110 and container 160 to allow the removal of container 160 from interior 110 of container 100 or the positioning of container 160 in interior 110 of container 100 prior to seed being introduced into interior 110 of container 100. In an alternative embodiment, container 160 rests against at least one of walls 112-118. Although container 160 is shown as being removable relative to container 100, in one embodiment, container 160 is rigidly coupled to container 100 or integrally formed as part of interior 110.

Referring to FIG. 1, container 160 includes a lid 190 which may be secured to upper portion 180 of container 160. Lid 190 includes cutouts 192 which receive supports 182-188. In one embodiment, lid 190 is a tamper proof lid which may be locked relative to container 160 to limit access to second compartment 152. In one embodiment, lid 190 is color-coded to indicate the type of seed being carried in second compartment 152. In one embodiment, lid 190 is made of a material which allows visual inspection of the contents of second compartment 152 from an exterior of container 160.

Figure 3:
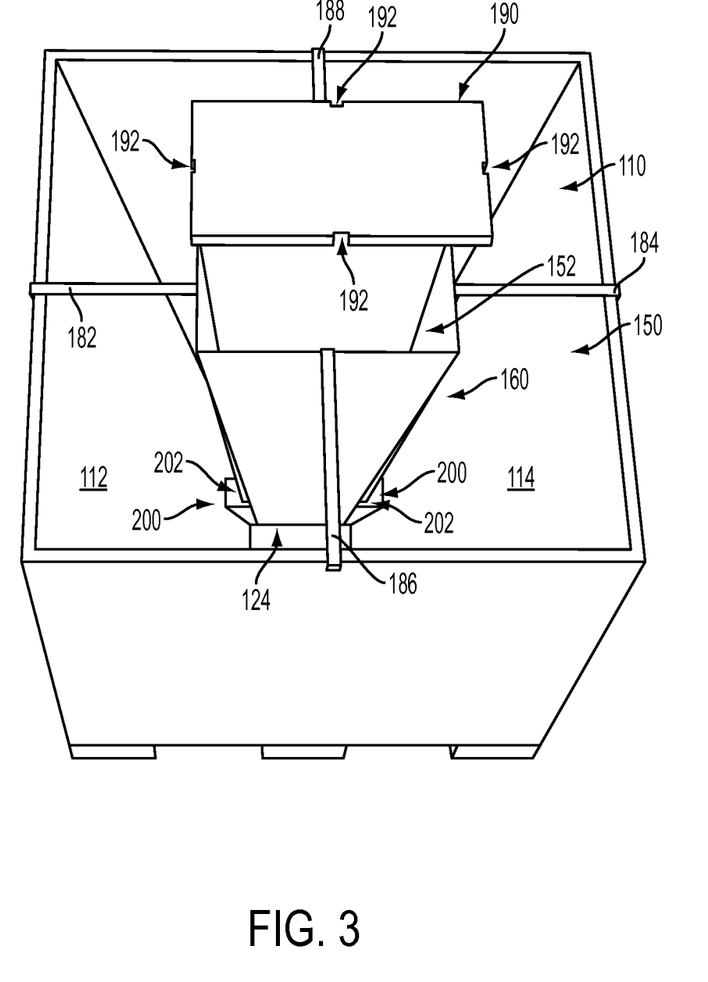
FIG. 3 illustrates a top perspective view of the container of FIG. 1.

Referring to FIG. 3, supports 200 are coupled to wall 112 and wall 114. Supports 200 define channels 202 which receive and locate the end of container 160 corresponding to opening 170. As shown in FIG. 5, supports 200 locate container 160 such that lower edge 172 generally coincides with lower edge 142 and lower edge 174 generally coincides with lower edge 144. This is illustrated in FIG. 9, wherein opening 170 of second compartment 152 is shown to be generally coextensive with opening 140 of first compartment 150. In contrast, along the orthogonal direction, as shown in FIG. 10, opening 170 of second compartment 152 is not coextensive with opening 140 of first compartment 150.

Figure 6:
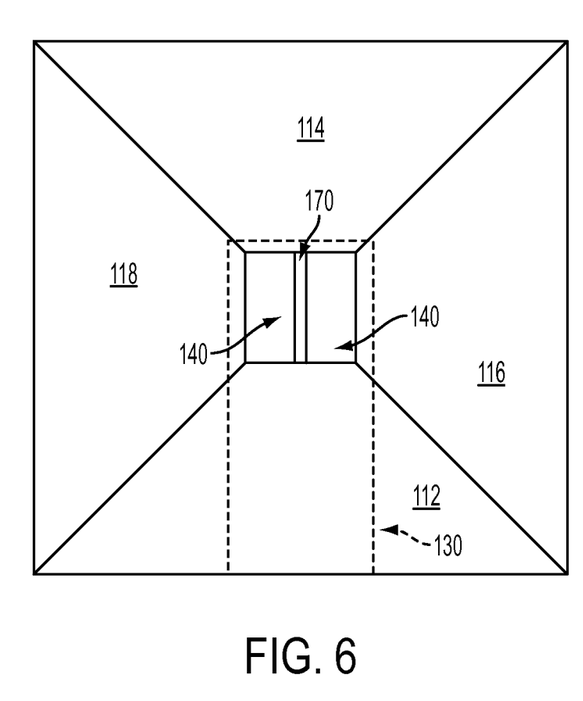
FIG. 6 illustrates a top view of the container of FIG. 1 illustrating the respective openings of the multiple compartments of the container when the gate is closed.
Figure 7:
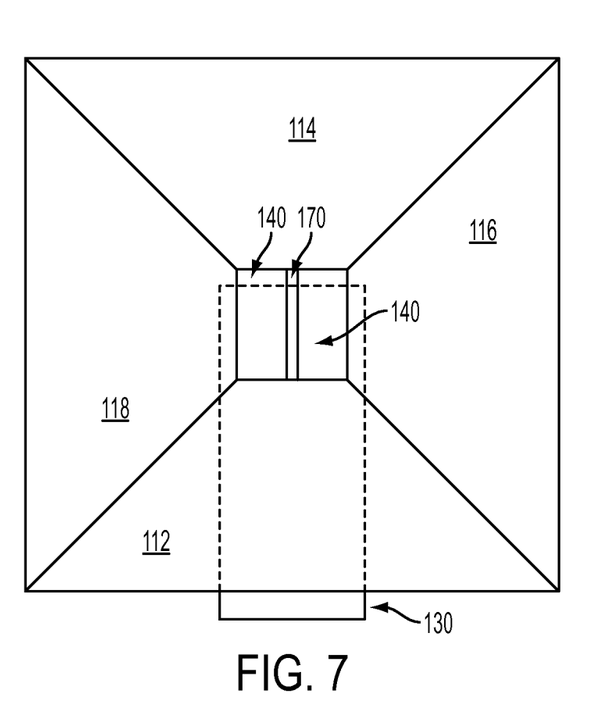
FIG. 7 illustrates a top view of the container of FIG. 1 illustrating the respective openings of the multiple compartments of the container when the gate is opened a first amount.
Figure 8:
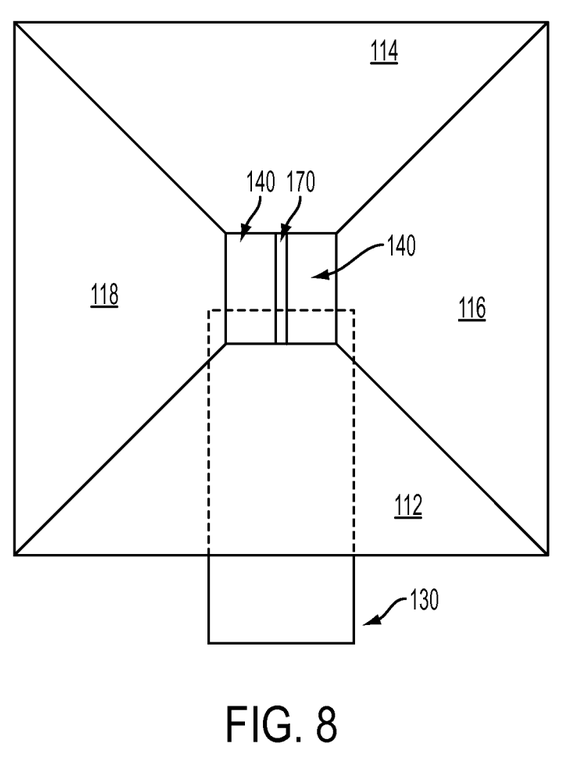
FIG. 8 illustrates a top view of the container of FIG. 1 illustrating the respective openings of the multiple compartments of the container when the gate is opened a second amount.

Returning to FIG. 5, as discussed above, the lengths of opening 140 and opening 170 are generally the same and the widths of opening 140 and opening 170 differ. By having the lengths the same, a ratio of the area of opening 170 to the area of opening 140 exposed by gate 130 when gate 130 is moved in direction 132 remains generally constant independent of the position of gate 130. Referring to FIGS. 6-8, gate 130 is shown in a closed position (FIG. 6), a first open position (FIG. 7), and a second open position (FIG. 8). By opening gate 130 further in direction 132 a flow rate of the seed from first compartment 150 and second compartment 152 is increased.

The generally constant ratio of opening 170 to opening 140 being exposed results in the mixture of the seed being emptied from container 100 maintaining a generally constant ratio regardless of the position of gate 130. In one embodiment, the ratio of seed from second compartment 152 to the seed from first compartment 150 being emptied from container 100 is about 5 to 95. Of course the relative sizes of opening 140 and opening 170 may be adjusted to alter the ratio of the mixture of seed being emptied from container 100.

Returning to FIG. 1, container 100 includes a plurality of spaced apart feet 210. Feet 210 are spaced apart to allow the arms of a forklift to be able to pass between feet 210 and to elevate container 100.

Container 100 may be coupled to a planting device such that seed exiting container 100 is planted in the ground by the planting device. Exemplary planting devices include pull-behind planters, drills, and other suitable planting devices. In one embodiment, since the ratio of the first type of seed exiting a first compartment of the container 100 and a second type of seed exiting the second compartment of the container is generally constant, the ratio of the first type of seed to the second type of seed planted by the planting device is generally constant.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. An apparatus for holding and delivering seed, the apparatus including:
    a container having a first compartment and a second compartment, the first compartment storing a first type of seed and the second compartment storing a second type of seed; and
    a gate moveably coupled to the container, the gate being moveable to:
        a first closed position preventing the first type of seed to empty from the first compartment and preventing the second type of seed to empty from second compartment;
        a first open position permitting the first type of seed to empty from the first compartment and at the same time permitting the second type of seed to empty from the second compartment, the first compartment and the second compartment segregating the first type of seed from the second type of seed until the first type of seed and the second type of seed are emptied from the first compartment and the second compartment, respectively, the first open position defining a first ratio of the first type of seed being emptied from the first compartment to the second type of seed being emptied from the second compartment; and
        a second open position defining a second ratio of the first type of seed being emptied from the first compartment to the second type of seed being emptied from the second compartment when the gate is in the second open position, the second ratio being generally equal to the first ratio.

2. The apparatus of claim 1, wherein the first compartment laterally surrounds the second compartment.

3. The apparatus of claim 1, further comprising a second container, the second container being removably coupled to the container and including the second compartment such that the second compartment is removable relative to the first compartment.

4. The apparatus of claim 3, wherein the second container includes an upper portion, the upper portion of the second container located relative to the first container with a plurality of support bars, the support bars coupling the upper portion of the second container to the first container.

5. The apparatus of claim 3, wherein the second container includes a lower portion, the lower portion of the second container being located by at least one supporting element of the first container.

6. The apparatus of claim 3, further comprising a lid, the lid configured to be coupled to the upper portion of the second container in order to limit access to the second compartment.

7. The apparatus of claim 6, wherein the lid is locked relative to the second container.

8. The apparatus of claim 6, wherein the lid includes identifying indicia of the second type of seed.

9. The apparatus of claim 8, wherein the identifying indicia is a color of the lid.

10. The apparatus of claim 6, wherein the lid permits visual inspection of the second seed in the second compartment from an exterior of the second container.

11. The apparatus of claim 1, wherein the first type of seed exits the first compartment through a lower portion of the first compartment and the second type of seed exits the second compartment through a lower portion of the second compartment.

12. The apparatus of claim 11, wherein the first type of seed exits the first compartment and the second type of seed exits the second compartment in a generally constant ratio.

13. The apparatus of claim 12, wherein the generally constant ratio is about 95 to 5.

14. The apparatus of claim 1, wherein the second compartment is contained by the first compartment.

15. The apparatus of claim 1, wherein the apparatus includes a region for receiving a tool for moving the apparatus.

16. The apparatus of claim 15, further comprising a plurality of spaced apart feet which define the region for receiving the tool for moving the apparatus.

17. The apparatus of claim 1, wherein the gate is in contact with both the first type of seed in the first compartment and the second type of seed in the second compartment when the gate is in a closed position.

18. The apparatus of claim 1, wherein the gate translates relative to the container to move to the first open position from a closed position.

19. The apparatus of claim 18, wherein the gate translates in a single direction to move to the first open position from the closed position.

20. The apparatus of claim 19, further comprising spaced apart channel members which receive the gate and constrain a movement of the gate relative to the container.

21. The apparatus of claim 1, further comprising spaced apart channel members which receive the gate and constrain a movement of the gate relative to the container.

22. The apparatus of claim 1, wherein the ratio of the first type of seed being emptied from the first compartment to the second type of seed being emptied from the second compartment when the gate is generally constant at all positions of the gate between the first open position and the second open position.

23. A method for delivering a mixture of seed, the method comprising the steps of:
    holding a first type of seed in a first compartment in an interior of a container;
    holding a second type of seed in a second compartment which is provided within the interior of the container; and
    emptying the first type of seed from the first compartment and the second type of seed from the second compartment by placing a gate at a first position,
    emptying the first type of seed from the first compartment and the second type of seed from the second compartment by placing the gate at a second position, the first and second positions of the gate providing for emptying of the first and second seeds at a generally constant ratio, the second type of seed being kept segregated from the first type of seed until the second type of seed and the first type of seed exit the container.

24. The method of claim 23, further comprising the step of locking the second compartment to limit access to the second compartment.

25. The method of claim 23, wherein the step of emptying the first type of seed from the first compartment and the second type of seed from the second compartment includes the step of simultaneously opening a lower portion of the first compartment and a lower portion of the second compartment.

26. The method of claim 25, wherein the step of simultaneously opening the lower portion of the first compartment and the lower portion of the second compartment includes the step of moving the gate relative to the container, the gate and the container cooperating to close the lower portion of the first compartment and the lower portion of the second compartment when the gate is in a first position relative to the container.

27. The method of claim 23, wherein the second compartment is provided in a second container positioned within the interior of the container.

28. The method of claim 23, wherein the generally constant ratio is a ratio of the first type of seed to the second type of seed and the generally constant ratio is 95:5.

29. The method of claim 23, further comprising the step of blending the first type of seed and the second type of seed upon exiting the first compartment and the second compartment, respectively.

30. The apparatus of claim 1, wherein the first type of seed and second type of seed are prevented from intermixing while in the container.

\* \* \* \* \*